(12) United States Patent
Moss

(10) Patent No.: US 7,620,729 B2
(45) Date of Patent: Nov. 17, 2009

(54) COMPLIANCE INITIATIVE NAVIGATION

(75) Inventor: Harold Moss, Danvers, MA (US)

(73) Assignee: International Business Machines Corporation, Armonk, NY (US)

( * ) Notice: Subject to any disclaimer, the term of this patent is extended or adjusted under 35 U.S.C. 154(b) by 602 days.

(21) Appl. No.: 11/470,399

(22) Filed: Sep. 6, 2006

(65) Prior Publication Data

US 2008/0059643 A1   Mar. 6, 2008

(51) Int. Cl.
*G06F 15/173* (2006.01)
(52) U.S. Cl. ............... 709/238; 709/223; 709/229; 709/203; 370/230
(58) Field of Classification Search ........... 709/238, 709/223, 229, 202, 203; 370/230
See application file for complete search history.

(56) References Cited

U.S. PATENT DOCUMENTS

| 5,890,139 | A | 3/1999 | Suzuki et al. ............... 705/27 |
|---|---|---|---|
| 6,175,833 | B1 | 1/2001 | West et al. ................. 707/102 |
| 6,408,336 | B1 * | 6/2002 | Schneider et al. .......... 709/229 |
| 6,708,209 | B1 * | 3/2004 | Ebata et al. ................. 709/223 |
| 7,315,890 | B2 * | 1/2008 | Tilton et al. ................. 709/223 |
| 7,440,940 | B2 * | 10/2008 | Chen et al. .................. 709/203 |
| 2005/0021978 | A1 * | 1/2005 | Bhat et al. .................. 713/182 |
| 2007/0143851 | A1 * | 6/2007 | Nicodemus et al. .......... 726/25 |
| 2008/0209505 | A1 * | 8/2008 | Ghai et al. ..................... 726/1 |

* cited by examiner

*Primary Examiner*—Philip B Tran
(74) *Attorney, Agent, or Firm*—Hamilton & Terrile, LLP; Michael Rocco Cannatti

(57) ABSTRACT

A method, apparatus and computer-usable medium for a virtual policy control router, comprising applicable control elements relating to one or more external or internal policies. Two or more policy control repositories are aggregated to create a virtual policy control router, accessible and navigable by users to provide relevant and applicable control elements for establishing policy compliance initiatives. One or more agents are implemented as a web service comprising a services oriented architecture (SOA) to access policy control elements in their native repositories. The web service agent communicates policy control information to the virtual policy control router, contingent upon each control repository's existing security model and access controls. As policy control information is received from each web service agent, it is relationally associated with predetermined users and/or initiatives by the virtual policy control router.

17 Claims, 3 Drawing Sheets

COMPLIANCE INITIATIVE NAVIGATION

BACKGROUND OF THE INVENTION

The present invention relates in general to the field of computers and similar technologies, and in particular to software utilized in this field. Still more particularly, it relates to compliance of policy initiatives.

Today's organizations face a myriad of regulatory and legislative mandates that require continuous oversight and ongoing management. Two of the better known of these mandates include the Sarbanes-Oxley Act to fight corporate fraud and the Health Information Portability and Accountability Act (HIPAA) to improve the privacy and security of patient's medical information. Others include the Patriot Act to counter a broad range of terrorist threats, Basel II to establish the standards for measuring the adequacy of a bank's capital, and SEC 17A-4 for the secure electronic storage of securities trading records. Increasingly, these and other applicable laws, rules and regulations have a direct impact on the policies that govern the operation of an organization and the behavior of its executives and employees.

The responsibility for complying with these laws and regulations generally resides in different functional silos within the organization, which can include risk management, finance, information technology (IT), legal, operations, sales, and human resources. While executive management is generally held accountable for ensuring that each party in their organization is aware of, and meets, their respective compliance responsibilities, gaining visibility across multiple compliance activities can be difficult. In addition, external regulations may contradict each other and/or conflict with internal policies and guidelines, causing confusion and operational inefficiencies. As a result, it is becoming common for regulatory compliance to be formalized as a functional area in its own right, responsible for coordinating the fragmented compliance activities of other groups while centralizing compliance oversight within the organization.

However, providing the means to effectively enforce policies and controls, whether external, internal, or both, can be challenging. Past approaches have addressed different aspects of the issue, including the implementation of rules-based and automated systems. But these systems are typically constrained within the functional silos of an organization. In view of the foregoing, there is a need for providing relevant guidance comprising applicable elements of one or more external or internal policies, regardless of their original intent or the location of their control sources within an organization, to facilitate policy compliance.

SUMMARY OF THE INVENTION

A method, system and computer-usable medium are disclosed for providing a virtual policy control router comprising applicable control elements relating to one or more external or internal policies. In selected embodiments, two or more policy control repositories are aggregated to create a virtual policy control router which is accessible and navigable to efficiently provide relevant and applicable control elements for establishing policy compliance initiatives. In these embodiments, similar, duplicate, conflicting and contradictory policy controls within the virtual policy control router are identified and referenced to each other, their source repository, and their associated policy for appropriate reconciliation. The resulting virtual policy control router is then accessed and navigated by users such that predetermined control elements and processes are selected, combined, and virtually associated as appropriate to establish control environments for their policy compliance initiatives.

In selected embodiments, a centralized server is implemented to create a virtual policy control router that allows users to access and navigate relevant and applicable control elements for establishing policy compliance initiatives. The resulting compliance initiatives may be stored in a compliance initiative reference system so that when users run reports on policy compliance initiatives, the reference system queries the virtual policy control router to retrieve results for each policy control element comprising a report. Related control element results are then aggregated to create reports, thereby reducing redundant reporting activity across multiple systems.

In selected embodiments, one or more agents are implemented at each repository with a web service in a services oriented architecture (SOA) to access policy control elements in their native repositories. Each agent contains relational information and leverages the existing security model for its control repository. Once implemented, the web service agent communicates policy control information (e.g., description, last update, current status, etc.) to the virtual policy control router, contingent upon each control repository's existing security model and access controls. As policy control information is received from each web service agent, it is relationally associated with predetermined users and/or initiatives by the virtual policy control router, which also provides access control security for user authentication. Thus, each agent manages all relational elements for the connection as opposed to returning control back to the router. In various embodiments, one or more web service agents may cache or dynamically retrieve policy control information from its native repository to service user requests communicated by the virtual policy control router. The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

Figure 1:
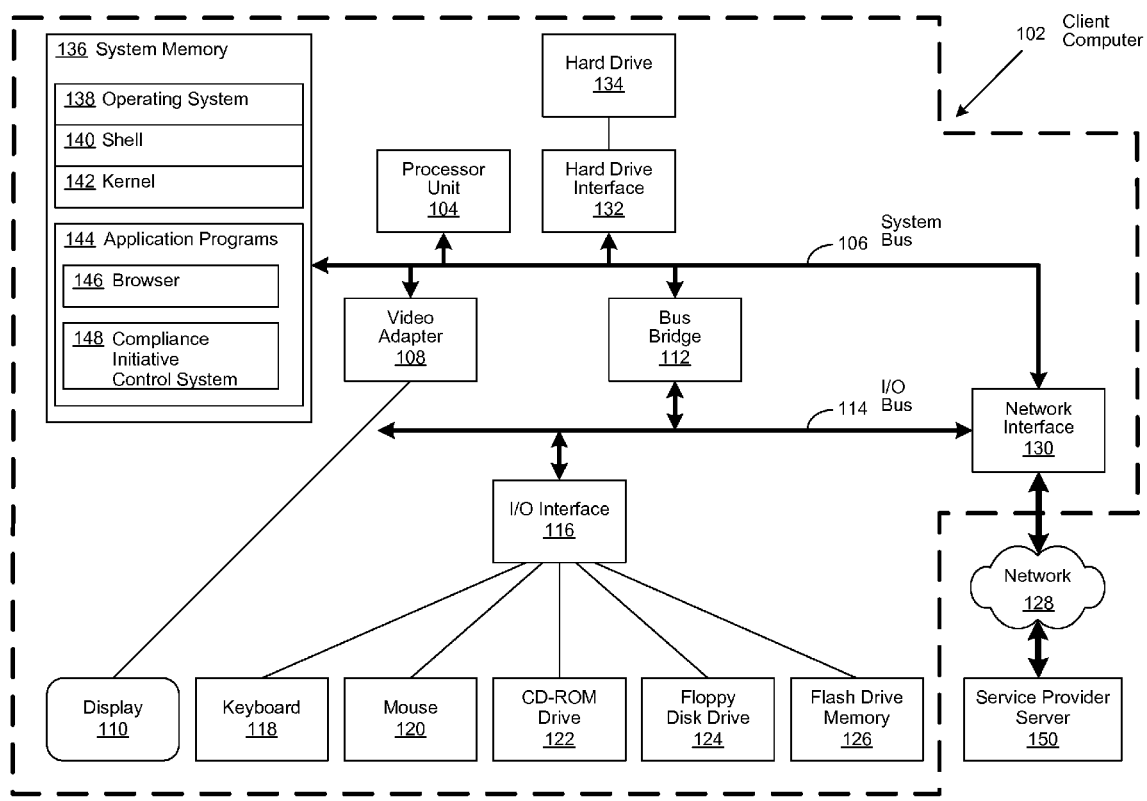
FIG. 1 depicts an exemplary client computer in which a compliance initiative control system may be implemented.

A method, apparatus and computer-usable medium are disclosed for a virtual policy control router comprising applicable control elements relating to one or more external or internal policies. In different embodiments of the invention, two or more policy control repositories are aggregated to create a virtual policy control router, accessible and navigable by users to provide relevant and applicable control elements for establishing policy compliance initiatives.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 150 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 150.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes client computer 102's operating system (OS) 138 and application programs 144.

OS 138 includes a shell 140 for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and application programs 144, including memory management, process and task management, disk management, and mouse and keyboard management.

Application programs 144 may include a browser 146. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 150.

Application programs 144 in client computer 102's system memory also include a compliance initiative control system 148. Compliance initiative control system 148 includes code for implementing the processes described hereinbelow. In one embodiment, client computer 102 is able to download compliance initiative control system 148 from a service provider server 150.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
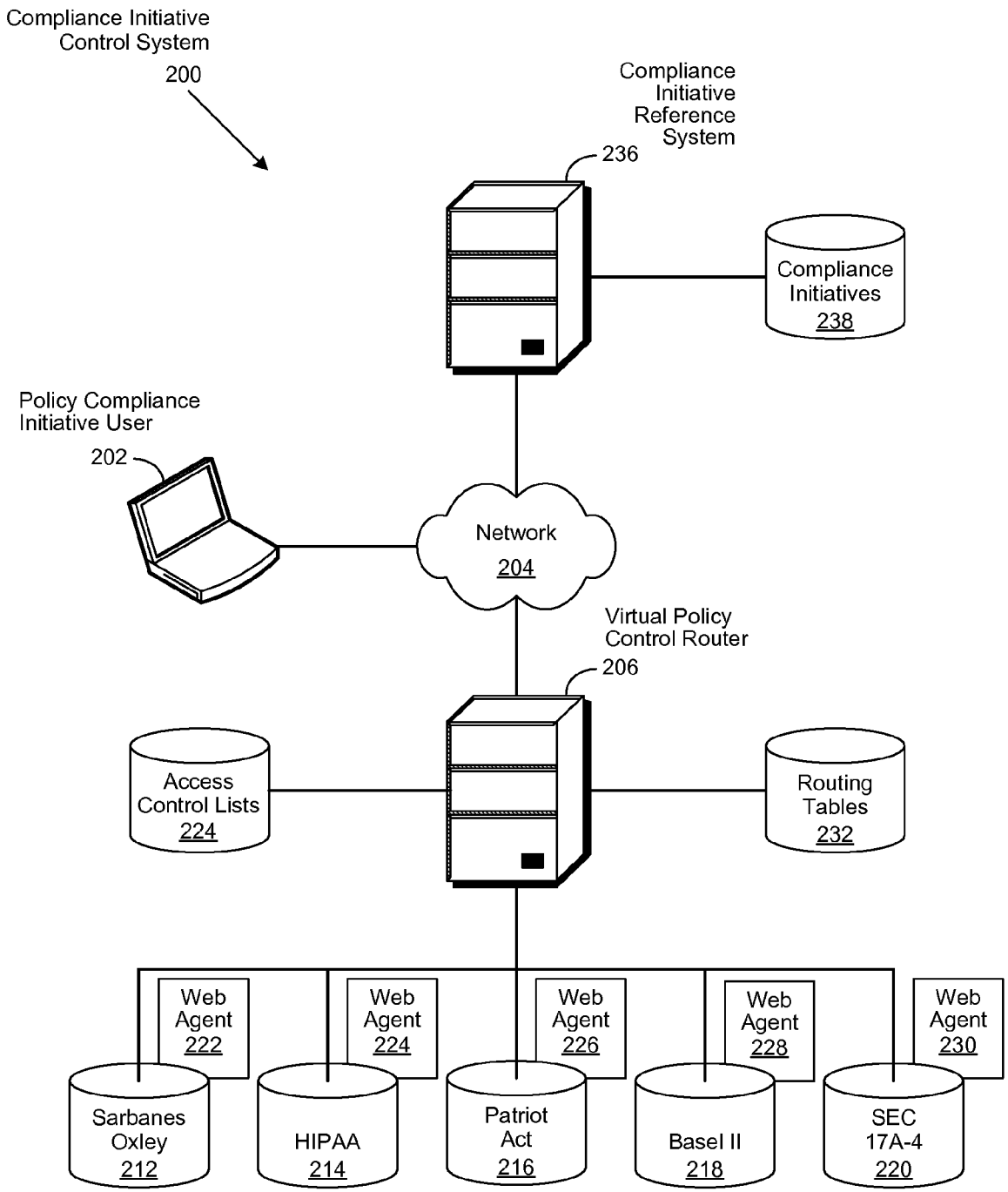
FIG. 2 is a generalized block diagram depicting an example compliance initiative control system.

FIG. 2 is a generalized block diagram depicting a compliance initiative control system 200 as implemented in accordance with selected embodiments of the invention. In operation, a policy compliance initiative user 202 may access a virtual policy control router 206 through a network 204 to create compliance initiatives 238 implemented on compliance initiative reference system 236. Compliance initiatives are created by referencing policy control elements comprising one or more policy control repositories such as, but not limited to, Sarbanes-Oxley 212, Health Information Portability and Accountability Act (HIPAA) 214, Patriot Act 216, Basel II 218, or SEC 17A-4 220. As will be appreciated, the Sarbanes-Oxley Act controls 212 are used to fight corporate fraud; the Health Information Portability and Accountability Act (HIPAA) controls 214 are used to improve the privacy and security of patient's medical information; the Patriot Act controls 216 are used to counter a broad range of terrorist threats; Basel II controls 218 are used to establish the standards for measuring the adequacy of a bank's capital; and SEC 17A-4 controls 220 are used to secure electronic storage of securities trading records.

In different embodiments of the invention, policy control repositories 212, 214, 216, 218 and 220 are aggregated to create a virtual policy control router 206 which is accessible and navigable to provide relevant and applicable control elements for establishing policy compliance initiatives 238. In these embodiments, similar, duplicate, conflicting and contradictory policy controls within the virtual policy control router 206 are identified and referenced to each other, their source repository (e.g., 212, 214, 216, 218 and 220), and their associated policy for appropriate reconciliation. The resulting virtual policy control router 206 is then accessed and navigated by policy compliance initiative user 202 such that predetermined control elements and processes are selected, combined, and virtually associated as appropriate to establish control environments for policy compliance initiatives 238.

In selected embodiments, virtual policy control router 206 is implemented on a centralized server that allows a policy compliance initiative user 202 to access and navigate relevant and applicable control elements for establishing policy compliance initiatives. In selected embodiments, compliance initiatives 238 are stored on a compliance initiative reference system 226. When policy compliance initiative user 202 runs reports on policy compliance initiatives 238, the compliance initiative reference system 236 queries the virtual policy control router 206 through network 204 to retrieve results for each policy control element comprising a report. Related control element results are then aggregated to create reports, thereby reducing redundant reporting activity across multiple systems.

In an embodiment of the invention, web service agents 222, 224, 226, 228, and 230 are implemented at each repository 212, 214, 216, 218 and 220 with a web service using a services oriented architecture (SOA) to access policy control elements in their respective native policy control repository 212, 214, 216, 218 and 220. Once implemented, web service agents 222, 224, 226, 228, and 230 communicate policy control information (e.g., description, last update, current status, etc.) to the virtual policy control router 206, contingent upon each control repository's existing security model and access controls. As policy control information is received from each web service agent 222, 224, 226, 228, and 230, it is relationally associated with predetermined users and/or initiatives in routing tables 232 by the virtual policy control router 236 with access control provided by access control lists 224. The router table(s) 232 may provide no additional security beyond basic authentication, and may associate records with individual users and/or initiatives. In another embodiment of the invention, web service agents 222, 224, 226, 228, and 230 cache or dynamically retrieve policy control information from their native policy control repository 212, 214, 216, 218 and 220 to service policy compliance initiative user 202 requests communicated by the virtual policy control router 206.

Figure 3:
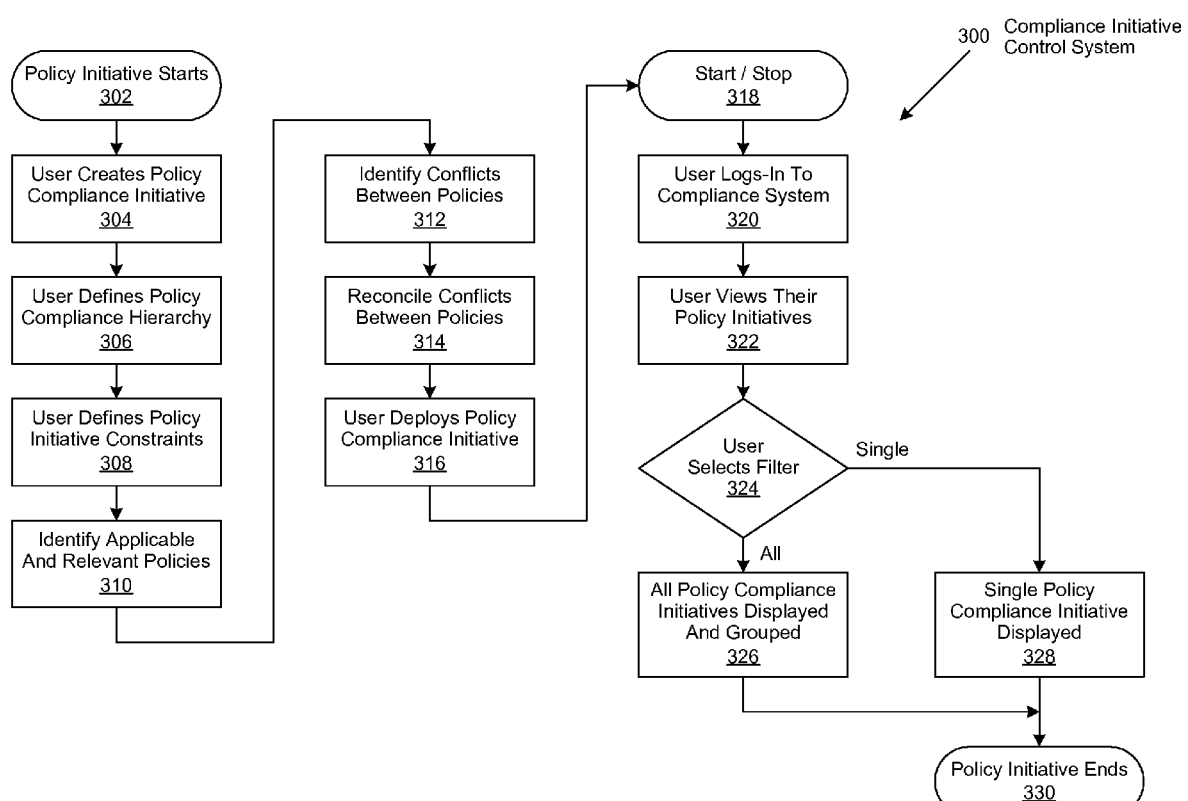
FIG. 3 is a generalized flowchart of an example compliance initiative control system.

FIG. 3 is a generalized flowchart of a compliance initiative control system 300 as implemented in accordance with an embodiment of the invention. In this embodiment of the invention, a policy initiative starts in step 302 with a user creating a policy initiative in step 304. The user defines a policy compliance hierarchy in step 306 and then defines policy initiative constraints in step 308. Applicable and relevant policies are identified in step 310, and once identified, conflicts and contradictions between the policies are identified in step 312 and then reconciled in step 314. Once policies have been identified and any conflicts or contradictions between them reconciled, the policy compliance initiative is deployed in step 316, after which it is placed in a response mode in step 318.

The compliance initiative control system 300 restarts in step 320 when a user logs-in. Once logged-in, the user views their applicable policy initiatives in step 322 to determine in step 324 if they wish to view all applicable policy initiatives or a single initiative. If the user determines in step 324 to view all applicable policy initiatives, then they are displayed in step 326 until the user ends the policy initiative in step 330. Otherwise, the user selects the appropriate filter in step 324 to view a single applicable policy initiative, which is then displayed in step 328 until the user ends the policy initiative in step 330.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDAs), telephones, and any other system capable of processing, transmitting, receiving, capturing and/or storing data.

What is claimed is:

1. A computer-implementable method comprising:
assembling a plurality of policy control repositories in a corresponding plurality of data sources, where at least a first policy control element is included in each of the plurality of policy control repositories;
aggregating at least the first policy control element from the plurality of policy control repositories to create a virtual policy control router by accessing one or more policy control elements in a first data source using a web service agent deployed at the first data source; and
accessing the virtual policy control router in response to a user request to provide applicable policy control elements for establishing a policy compliance initiative.

2. The computer-implementable method of claim 1 wherein aggregating at least the first policy control element comprises:
accessing the plurality of data sources using a services oriented architecture approach.

3. The computer-implementable method of claim 1 wherein aggregating at least the first policy control element comprises:
storing policy control information for each policy control repository in a common control routing table.

4. The computer-implementable method of claim 1 wherein accessing the virtual policy control router comprises using a web service agent to cache information requested by the user.

5. The computer-implementable method of claim 1 wherein accessing the virtual policy control router comprises using a web service agent to dynamically retrieve information requested by the user.

6. A system comprising:
a processor;
a data bus coupled to the processor; and
a computer-usable storage medium embodying computer program code, the computer-usable medium being coupled to the data bus, the computer program code comprising instructions executable by the processor and configured for:
assembling a plurality of policy control repositories in a corresponding plurality of data sources, where at least a first policy control element is included in each of the plurality of policy control repositories;
aggregating at least the first policy control element from the plurality of policy control repositories to create a virtual policy control router by accessing one or more policy control elements in a first data source using a web service agent deployed at the first data source; and
accessing the virtual policy control router in response to a user request to provide applicable policy control elements for establishing a policy compliance initiative.

7. The system of claim 6, wherein the instructions are further configured for:
aggregating at least the first policy control element by accessing the plurality of data sources using a services oriented architecture approach.

8. The system of claim 6, wherein the instructions are further configured for:
aggregating at least the first policy control element by storing policy control information for each policy control repository in a common control routing table.

9. The system of claim 6, wherein the instructions are further configured for:
accessing the virtual policy control router by using a web service agent to cache information requested by the user.

10. The system of claim 6, wherein the instructions are further configured for:
accessing the virtual policy control router by using a web service agent to dynamically retrieve information requested by the user.

11. A computer-usable storage medium embodying computer program code, the computer program code comprising computer executable instructions configured for:
assembling a plurality of policy control repositories in a corresponding plurality of data sources, where at least a first policy control element is included in each of the plurality of policy control repositories;
aggregating at least the first policy control element from the plurality of policy control repositories to create a virtual policy control router by accessing one or more policy control elements in a first data source using a web service agent deployed at the first data source; and
accessing the virtual policy control router in response to a user request to provide applicable policy control elements for establishing a policy compliance initiative.

12. The computer-usable storage medium of claim 11, wherein the embodied computer program code further comprises computer executable instructions configured for:
aggregating at least the first policy control element by accessing the plurality of data sources using a services oriented architecture approach.

13. The computer-usable storage medium of claim 11, wherein the embodied computer program code further comprises computer executable instructions configured for:
aggregating at least the first policy control element by storing policy control information for each policy control repository in a common control routing table.

14. The computer-usable storage medium of claim 11, wherein the embodied computer program code further comprises computer executable instructions configured for:
accessing the virtual policy control router by using a web service agent to cache information requested by the user.

15. The computer-usable storage medium of claim 11, wherein the embodied computer program code further comprises computer executable instructions configured for:
accessing the virtual policy control router comprises using a web service agent to dynamically retrieve information requested by the user.

16. The computer-useable storage medium of claim 11, wherein the computer executable instructions are deployable to a client computer from a server at a remote location.

17. The computer-useable storage medium of claim 11, wherein the computer executable instructions are provided by a service provider to a customer on an on-demand basis.

* * * * *

UNITED STATES PATENT AND TRADEMARK OFFICE
CERTIFICATE OF CORRECTION

PATENT NO. : 7,620,729 B2  
APPLICATION NO. : 11/470399  
DATED : November 17, 2009  
INVENTOR(S) : Harold Moss Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 674 days.

Signed and Sealed this

Twenty-sixth Day of October, 2010

David J. Kappos  
*Director of the United States Patent and Trademark Office*